Figure 1:
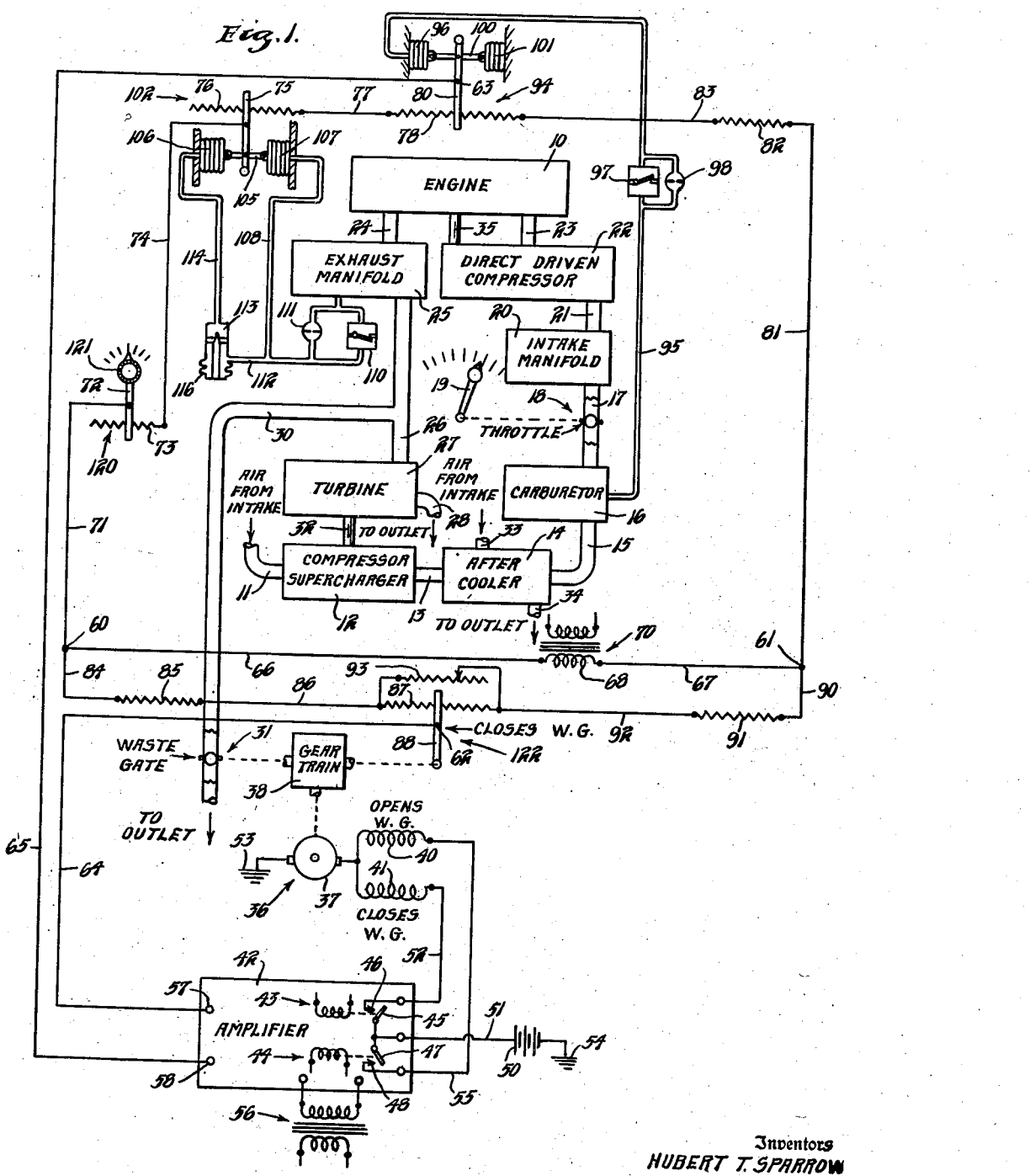

Inventors
HUBERT T. SPARROW
ALBERT E. BAAK.
By George H. Fisher
Attorney

June 21, 1949.   H. T. SPARROW ET AL   2,474,203
CONTROL APPARATUS
Filed Feb. 22, 1943   5 Sheets-Sheet 4
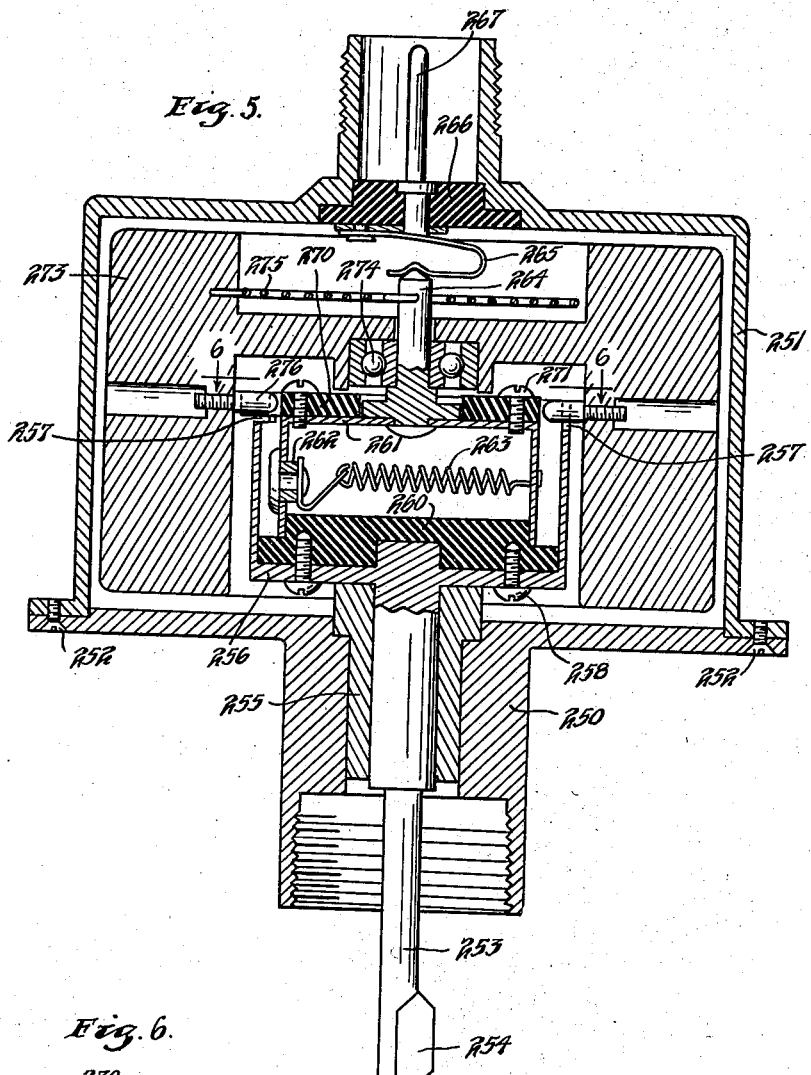
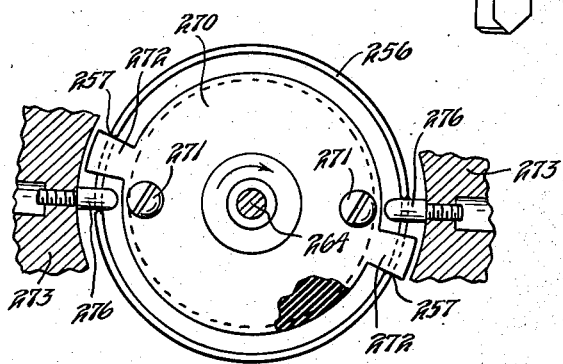
Inventors
HUBERT T. SPARROW
ALBERT E. BAAK.
By George H. Fisher
Attorney June 21, 1949.  H. T. SPARROW ET AL  2,474,203
CONTROL APPARATUS
Filed Feb. 22, 1943
5 Sheets-Sheet 5
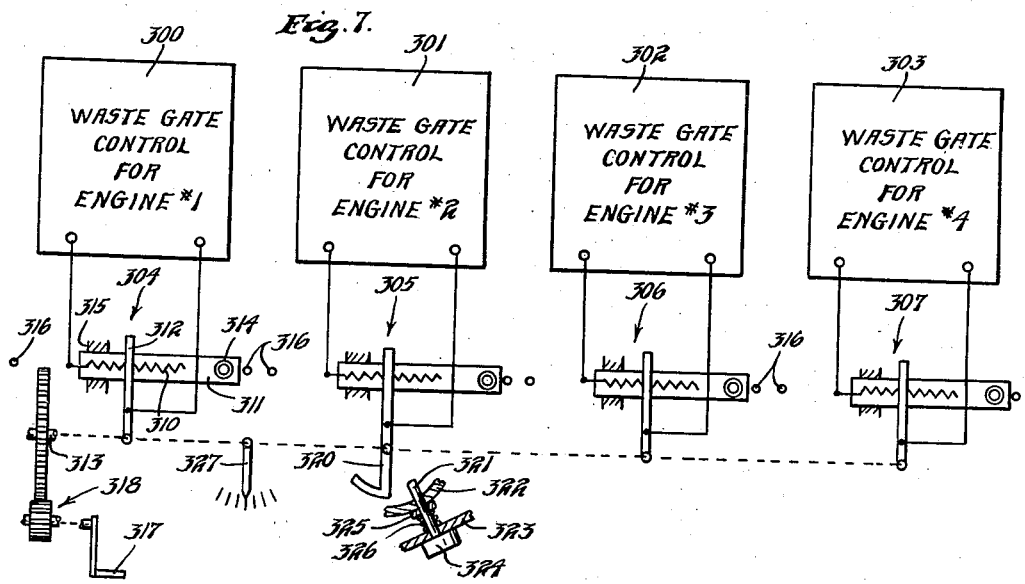
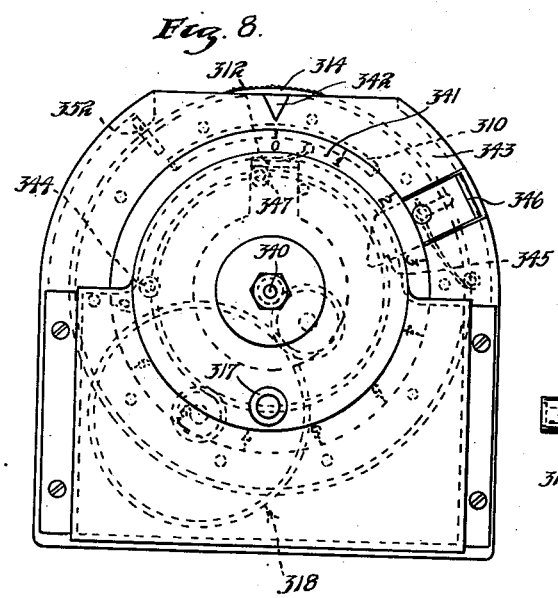
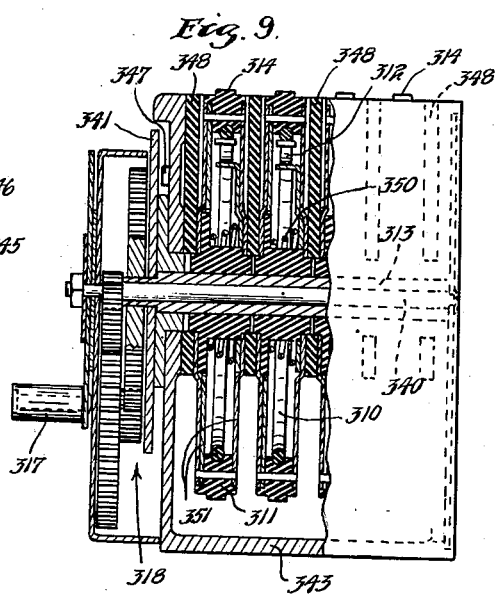
Inventors
HUBERT T. SPARROW
ALBERT E. BAAK
By George H. Fisher
Attorney Patented June 21, 1949

2,474,203

UNITED STATES PATENT OFFICE 2,474,203

CONTROL APPARATUS

Hubert T. Sparrow, Minneapolis, Minn., and Albert E. Baak, Los Angeles, Calif., assignors to Minneapolis-Honeywell Regulator Company, Minneapolis, Minn., a corporation of Delaware Application February 22, 1943, Serial No. 476,798

21 Claims. (Cl. 230—5)

The present invention relates to apparatus for controlling the pressure of air supplied to an engine having a combustion chamber, particularly an engine which is provided with a compressor for supplying the intake manifold with air at a pressure greater than atmospheric.

Internal combustion engines used on aircraft are commonly provided with a compressor, usually termed a supercharger, which is driven by a turbine powered by the exhaust gases of the engine. The speed of the turbine, and hence the compression ratio of the compressor, is controlled by a device termed a waste gate, which is a valve or damper which by-passes part of the exhaust gases from the exhaust manifold directly to the atmosphere instead of directing them through the turbine. In order to secure optimum operation of an engine, it is usually desirable to maintain the pressure of air fed into the combustion chamber of the engine at a substantially constant value. The intake manifold pressure may be varied either by adjusting the position of the throttle or by adjusting the position of the waste gate associated with the turbine which drives the supercharger.

It is therefore an object of the present invention to provide an improved system for automatically controlling the waste gate of a supercharger in order to maintain the pressure in the intake manifold of an internal combustion engine substantially constant. A further object is to provide an improved system of the type disclosed in the copending application of Hubert T. Sparrow, Serial No. 474,378, filed February 1, 1943.

A further object of this invention is to provide a system in which the waste gate is moved proportionately to variations in the intake manifold pressure, but in which that proportionate movement is varied in accordance with a condition indicative of the acceleration of the turbine and compressor. A further object is to provide a system of the type described in which the rate of change of the exhaust pressure is utilized as a condition indicative of the acceleration of the turbine. A further object is to provide such a system in which the acceleration of the turbine is directly utilized to compensate the action of the system.

A further object of the present invention is to provide an improved control system for moving a load device between a position of maximum activity and a position of maximum safety, in which the system responds more quickly to a change in a controlling condition in a direction indicative of a need for movement of the load device toward its position of maximum safety, and less quickly when the condition changes in a direction indicative of a need for movement of the device toward its position of maximum activity.

A further object of the invention is to provide a system for controlling the waste gate of a supercharger to control the intake manifold pressure of an internal combustion engine, in which the system responds more quickly to an increase in the intake manifold pressure than to a decrease in the intake manifold pressure.

Another object of the present invention is to provide an improved electrical system for controlling the intake manifold pressure of an internal combustion engine.

Another object of the present invention is to provide an improved system for simultaneously controlling the pressure in all the intake manifolds of a multi-engined aircraft.

A further object of the present invention is to provide an improved arrangement for operating an electrical controller in accordance with the acceleration of a rotating shaft.

Another object is to provide an improved arrangement for operating an electrical controller in accordance with either the acceleration or the velocity of a rotating shaft.

Figure 2:
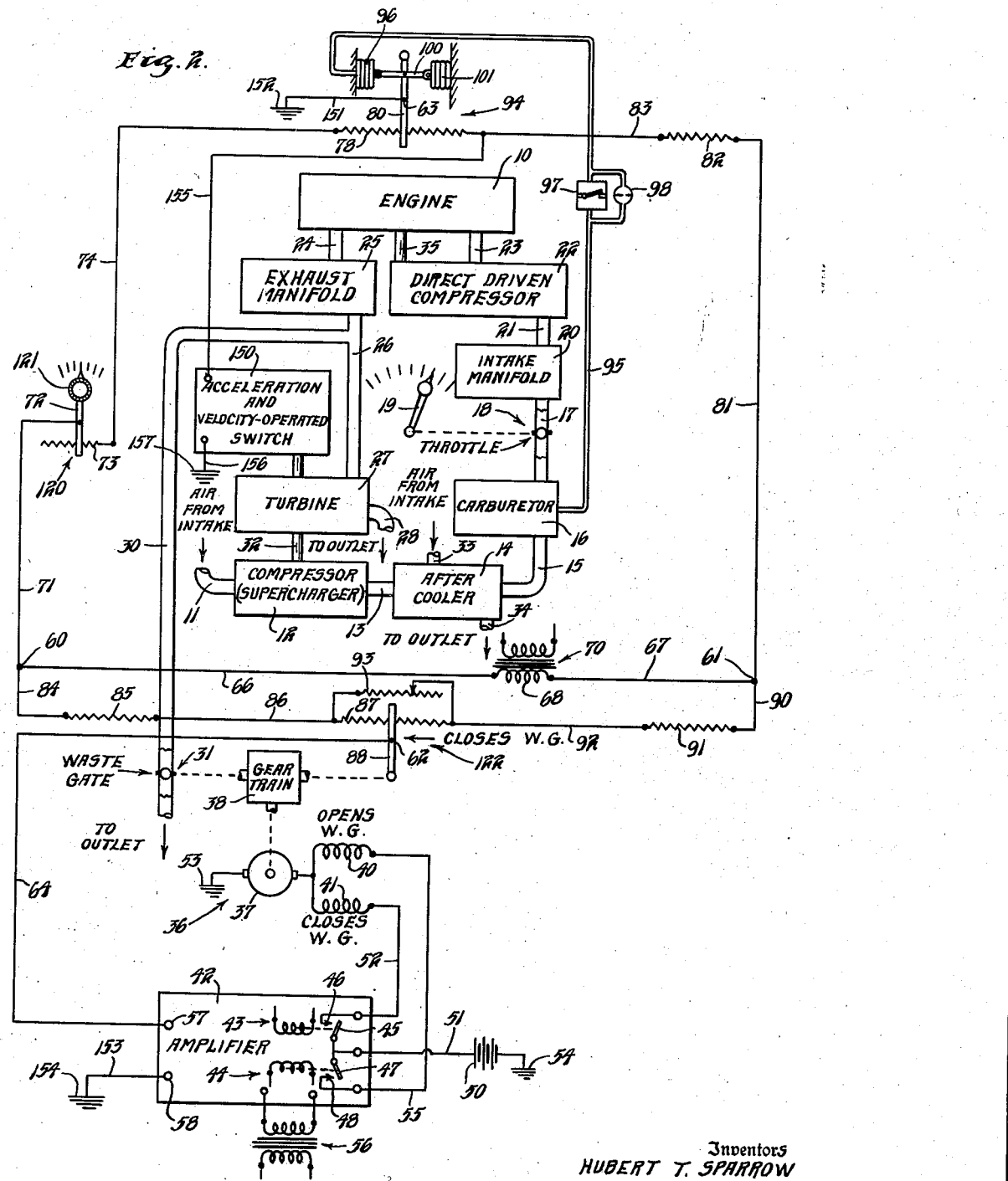
Figure 3:
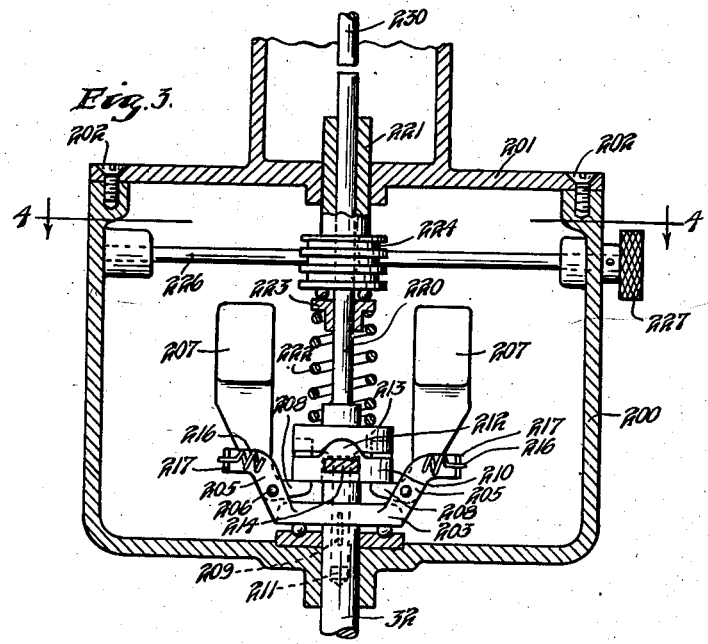
Figure 4:
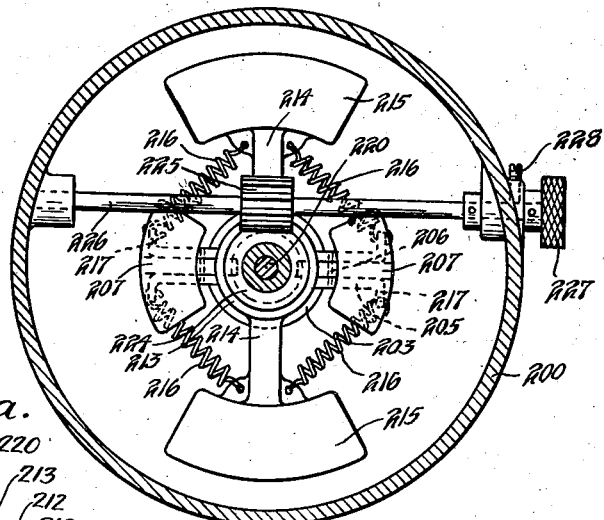
Figure 3A:
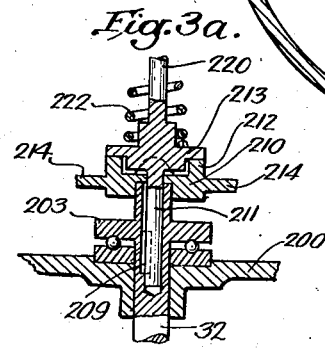

Other objects and advantages of the present invention will become apparent from a consideration of the appended specification, claims, and drawings, in which:

Figure 1 illustrates, somewhat diagrammatically, an intake manifold pressure control system embodying certain features of our invention, Figure 2 illustrates a modification of the system of Figure 1, Figure 3 is a cross-sectional elevation of an acceleration and velocity responsive electrical controller which may be used in the system of Figure 2, Figure 3a is a cross-sectional elevation of a portion of the controller of Figure 3, Figure 4 is a cross-sectional view taken along the line 4—4 of Figure 3, looking in the direction of the arrows, Figure 5 is a cross-sectional elevation of a modified form of acceleration and velocity responsive electrical controller which may be used in the system of Figure 2, Figure 6 is a cross-sectional view of a portion of the controller shown in Figure 5, taken along the line 6—6, looking in the direction of the arrows, Figure 7 is a diagrammatic illustration of the application of either of the systems of Figures 1 and 2 to a multi-engined aircraft.

Figure 8 is an elevational view of a gang controller for the control systems of a multi-engined aircraft, and Figure 9 is a cross-sectional side view of the controller of Figure 8.

Referring to Figure 1, there is schematically shown an internal combustion engine 10, which may be in an aircraft. Air for supporting combustion in the engine 10 passes from an intake, not shown in the drawing and conventionally located in the leading edge of the wing of the aircraft through a conduit 11, a compressor 12, a conduit 13, an after-cooler 14, a conduit 15, a carburetor 16, a conduit 17 in which a throttle 18 is located, an intake manifold 20, a conduit 21, a direct-driven compressor 22, and a conduit 23 to the engine 10.

The exhaust gases from the engine 10 pass through a conduit 24 to an exhaust manifold 25, and thence may pass through a conduit 26, a turbine 27, and a conduit 28 to an outlet not shown in the drawing, but usually located in the trailing edge of the wing of the aircraft.

A conduit 30 connects the conduit 26 with the exhaust gas outlet previously mentioned. In the conduit 30 is located a waste gate 31, whose position determines the proportion of the total exhaust gas of the engine passing through the turbine 26. The compressor 12 is driven by the turbine 27 through a shaft 32.

The after-cooler 14 is provided to reduce the temperature of the air leaving the compressor, wherein its temperature is increased due to the heat of compression. In the after-cooler, the compressed air received from the compressor passes in heat exchange relation with air received from the intake, previously mentioned, through a conduit 33, which after passing through the after-cooler is discharged through a conduit 34 to the outlet.

In the carburetor 16, fuel from a supply not shown is mixed with the air. The throttle 18 may be positioned by operation of a lever 19. In most carburetors, the throttle is within the carburetor itself. In the present instance, it is shown separately merely for the sake of clarity in the drawing.

Likewise, the direct-driven compressor is in most cases located within the housing of the intake manifold, but has been shown separately for the sake of convenience. The compressor 22 is directly driven by the engine 10 through the shaft 35. Such a direct-driven compressor is usually geared up so that it rotates faster than the engine, and in many engines it is utilized not only as a compressor, but to distribute evenly the mixture of fuel and air to the various engine cylinders.

The waste gate 31 is driven by a motor 36 through a gear train schematically indicated at 38. The motor 36, which is of the direct current, series wound type, includes an armature 37 and a pair of field windings 40 and 41. As indicated by the legend in the drawing, the motor and the gear train are so constructed that when field winding 40 is energized the motor rotates in a direction to open the waste gate, and when field winding 41 is energized, the motor is driven in a direction to close the waste gate.

Energization of motor 36 is controlled by an amplifier 42. The amplifier 42 may be of any suitable type, although we prefer to use one of the type illustrated in Figure 2 of the co-pending application of Albert P. Upton, Serial No. 437,561, filed April 3, 1942, now Patent No. 2,423,534 of July 8, 1947.

The amplifier 42 includes a pair of relays 43 and 44. The relay 43 controls the movements of a switch arm 45 with respect to a stationary contact 46, with which it is engaged when the winding of relay 43 is energized. Similarly, the relay 44 controls the movements of a switch arm 47 with respect to a stationary contact 48, with which it is engaged when the winding of relay 44 is energized.

When switch arm 45 engages contact 46, an energizing circuit is completed for motor 36 which includes field winding 41. This circuit may be traced from the left hand terminal of a battery 50, through a conductor 51, switch arm 45, contact 46, a conductor 52, field winding 41, armature 37, and ground connections 53 and 54 to the right hand terminal of battery 50.

When switch arm 47 engages contact 48 an energizing circuit is completed for motor 36 which includes field winding 40. This circuit may be traced from the left hand terminal of battery 50 through conductor 51, switch arm 47, contact 48, a conductor 55, field winding 40, armature 37, and ground connections 53 and 54 to the right hand terminal of battery 50.

The amplifier 42 has signal input terminals 57 and 58, and operates to selectively energize the windings of the relays 43 and 44 in accordance with the phase of an alternating electrical potential applied to the input terminals 57 and 58. Electrical energy is supplied to the amplifier 42 from a transformer 56.

The phase of the electrical potential applied to input terminals 57 and 58 is determined by an electrical network of the Wheatstone bridge type, having input terminals 60 and 61 and output terminals 62 and 63. The output terminals 62 and 63 of the bridge circuit are connected through conductors 64 and 65 respectively to the input terminals 57 and 58 of amplifier 42. The input terminals 60 and 61 of the bridge circuit are connected through conductors 66 and 67 respectively to the opposite terminals of a secondary winding 68 of transformer 70. The transformers 56 and 70 are preferably connected to the same source of electrical energy.

The upper left branch of the bridge circuit, as it appears in the drawing, connects input terminal 60 with output terminal 63. This branch may be traced from input terminal 60 through a conductor 71, a slider 72, a slidewire resistance 73 which cooperates with slider 72, a conductor 74, a slider 75, a slidewire resistance 76 which cooperates with slider 75, a conductor 77, a portion of a slidewire resistance 78, and a slider 80 which cooperates with resistance 78, to the output terminal 63, which is shown as being located on the slider 80.

The upper right branch of the bridge circuit, as it appears in the drawing, connects input terminal 61 with output terminal 63. This branch may be traced from input terminal 61 through a conductor 81, a fixed resistance 82, a conductor 83, a portion of resistance 78, and slider 80 to output terminal 63.

The lower left branch of the bridge circuit, as it appears in the drawing, connects input terminal 60 with output terminal 62. This branch may be traced from input terminal 60 through a conductor 84, a fixed resistance 85, a conductor 86, a portion of a slidewire resistance 87, and a slider 88 cooperating with resistance 87, to output terminal 62, which is shown as being located on slider 88.

The lower right branch of the bridge circuit connects input terminal 61 with output terminal 62, and may be traced from input terminal 61 through a conductor 90, a fixed resistance 91, a conductor 92, a portion of resistance 87, and slider 88, to output terminal 62.

A variable resistance 93 is connected in parallel with the resistance 87, for purposes to be described later.

The slider 80 and the resistance 78 together form a control potentiometer 94. The slider 80 is moved along the resistance 78 in accordance with the absolute pressure of the air supplied by the compressor 12. This pressure may be measured at any point in the path of the air discharged by the supercharger, but is preferably measured at a point fairly remote from the supercharger and preceded by a straight stretch of conduit, so that the effects of turbulence in the flowing air are avoided. In the modification of our invention illustrated in the drawing, we have shown, by way of example, that the pressure for operating the controller 94 is taken from the carburetor 16 through a conduit 95 to an expansible bellows 96. A check valve 97, by-passed by an orifice 98, is included in the duct 95. The left end of the bellows 96 is fixed and its right end is free to move in accordance with the pressure existing within the bellows. A link 100 is attached to the free end of the bellows 96. The opposite end of the link 100 is connected to the free end of a second bellows 101, the interior of which is evacuated. An intermediate point on the link 100 is connected, as by a pin and slot connection (not shown), to the slider 80, which is mounted for pivotal movement about its upper end.

Since the interior of bellows 101 is evacuated, changes in the atmospheric pressure, acting through the bellows 101, produce forces tending to move the link 100 in a direction opposite to an equal force produced by the same atmospheric pressure acting on the bellows 96. For example, as the atmospheric pressure increases, both the bellows 96 and 101 tend to collapse. The bellows 96 therefore exerts a force on link 100 tending to move it to the left, while the bellows 101 exerts a force on link 100 tending to move it to the right. The effects of the atmospheric pressure on the two bellows therefore counteract each other, so that the position of the slider 80 is determined only by the absolute pressure existing within the bellows 96.

When the pressure within the carburetor 16 increases, the check valve 97 opens and the increase in pressure is quickly transmitted to the interior of bellows 96. However, when the pressure within the carburetor 16 decreases, the check valve 97 closes, and the change in pressure is not reflected in the interior of bellows 96 until a time has elapsed sufficient for the flow of fluid through the orifice 98 to equalize the pressures on the opposite sides of that orifice.

The slider 75 and the resistance 76 together form a compensating controller 102. The slider 75 is mounted for pivotal movement about its lower end, and is driven by a link 105, as by a pin and slot connection (not shown) located at an intermediate point on the link 105. The left end of link 105 is attached to the free end of a bellows 106, and the right end of link 105 is attached to the free end of a bellows 107. The interior of the bellows 107 is supplied with pressure from the exhaust manifold 25 through a conduit 108 and a check valve 110 by-passed by an orifice 111. Pressure from the interior of the exhaust manifold 25 is also transmitted through the check valve 110 and orifice 111, a conduit 112, a needle valve 113, and a conduit 114 to the interior of bellows 106. The needle valve 113 is operated by a bellows 116, whose interior is exposed to the pressure from the exhaust manifold, and whose exterior is exposed to atmospheric pressure.

Since the pressure from the exhaust manifold 25, after passing through check valve 110 and orifice 111, passes directly to the interior of bellows 107, but is restricted in its passage to the interior of bellows 106 by the needle valve 113, it may be seen that upon a rapid change in pressure in the exhaust manifold 25, the force tending to expand bellows 107 increases more rapidly than the force tending to expand bellows 106, and hence the link 105 is moved to the left, carrying the slider 75 along the resistance 76. When the pressure in the exhaust manifold 25 stops changing, the pressures in the interior of the two bellows 106 and 107 gradually become equalized through the needle valve 113, and the slider 75 gradually moves back to its normal position.

The check valve 110 operates to rapidly transmit an increase in the exhaust manifold pressure to the bellows 106 and 107 and to delay the transmission of a decrease in the exhaust manifold pressure to the bellows. Upon a decrease in the exhaust manifold pressure, the check valve 110 closes, so that the pressure in the two bellows must slowly equalize with the pressure in the exhaust manifold through the orifice 111.

The slider 72 and resistance 73 together form a control point adjuster 120. The slider 72 is movable along resistance 73 by operation of a knob 121. The knob 121 is so located as to be under the control of one of the members of the crew of the aircraft, preferably the pilot.

The slider 88 and resistance 87 together form a rebalancing potentiometer 122. The slider 88 is moved along the resistance 87 by the motor 36, acting through the gear train 38.

*Operation of Figure 1*

When the parts are in the positions shown in the drawing, the waste gate is half open, as indicated by the position of the slider 88 at the midpoint of resistance 87. The bridge circuit is balanced, so that the bridge output terminals 62 and 63 are at the same potential. Hence no signal potential is applied to the input terminals 57 and 58 of amplifier 42, and neither of the relays 43 and 44 is energized. The motor 36 therefore is not energized and the waste gate remains at its half open position.

Now let it be assumed that the pressure of the air in the carburetor 16 decreases, due for example, to an increase in the altitude of the aircraft. Such a decrease in pressure is slowly transmitted to the interior of bellows 96 through the orifice 98. As the pressure inside bellows 96 decreases, the slider 80 is moved to the left along resistance 78. The potential of slider 80, and hence the potential of output terminal 63 then changes, becoming closer to the potential of input terminal 60. A potential difference then exists between output terminals 63 and 62 of the bridge circuit, and the phase of this potential is the same as that which exists between bridge input terminals 60 and 61, respectively. It may be assumed that the amplifier 42 responds to a potential of this phase applied to its input terminals by causing energization of relay 43. Energization of relay 43 completes the energizing circuit for motor 36, previously traced, which causes rotation of the motor 36 in a direction to close the waste gate and to move the slider 88 to the left along resistance 87. Movement of slider 88 to the left along resistance 87 changes the potential of output terminal 62 toward that of input terminal 60, so that the potential difference between the ouput terminals 62 and 63 is reduced. At the same time, movement of the waste gate towards closed position causes an increase in the pressure in the exhaust manifold, and an increasing proportion of the exhaust gases of the engine then passes through the turbine 27, thereby increasing the speed of the turbine and the compressor 12. This increase in speed of the compressor 12 causes an increase in the compression ratio between the output pressure and the input pressure of the compressor. The intake manifold pressure is therefore increased, and the increase is rapidly transmitted through the duct 95 and check valve 97 to the interior of bellows 96. The increased pressure in bellows 96 moves the slider 80 back to the right along resistance 78. As soon as the sliders 80 and 88 reach positions at which their potentials are the same, the signal potential impressed on the input terminals of amplifier 42 is reduced to zero, and the relay 43 is therefore deenergized. The motor 36 then stops, with the waste gate remaining in a new position. It will be readily understood that the distance moved by the waste gate is proportional to the pressure drop which initiated the movement, the proportion being determined by the ratio between the potential drops per unit length along the resistances 78 and 87.

In a similar manner, an increase in the pressure of the air supplied by the compressor 12 causes a movement of slider 80 to the right along resistance 78, which changes the potential of output terminal 63 with respect to that of output terminal 62 in a sense opposite to that encountered under the conditions previously described. The alternating signal impressed on the input terminals of amplifier 42 is then of a phase opposite to that which was previously impressed on its input terminals. The amplifier 42 responds to this new signal potential by causing energization of the winding of relay 44. This operates switch arm 47 into engagement with contact 48, completing the energizing circuit for motor 36 which includes field winding 46 and causes rotation of the motor in a direction to open the waste gate and to move the slider 88 to the right along resistance 87. This motion continues until the slider 88 has moved a sufficient amount to balance the motion of slider 80 with respect to resistance 78. The opening movement of the waste gate allows a greater proportion of the total exhaust to escape to the atmosphere, thereby reducing the pressure in the exhaust manifold, and reducing the speed of the turbine and compressor.

By manipulating the variable resistance 93, the total resistance between the terminals of resistance 87 may be varied, and hence the total potential drop across the resistance 87 is likewise varied. Since the total potential drop is varied, the potential drop per unit length of resistance 87 is changed. Therefore, by changing the variable resistance 93, it is possible to adjust the distance through which the slider 88 must move along resistance 87 in order to balance the bridge circuit after a given unbalancing movement of slider 80 along resistance 78. The resistance 93 may be termed a ratio adjusting resistance, since it determines the ratio between a given movement of the controlling slider 80 and the required following movement of the rebalancing slider 88.

When the turbine 27 is accelerating, due to a movement of the waste gate 31 toward closed position, the turbine may continue to accelerate after the waste gate has stopped moving, because of the inherent lag in the system between the carburetor 16 where the pressure sensing take-off is located and the exhaust manifold and because of the inertia of the turbine and compressor. If such an acceleration of the turbine continues after the waste gas has stopped moving, it causes an increase in the pressure of the air supplied by the supercharger, which acts through the controller 94 and the system which controls motor 36 to cause a movement of the waste gate back toward its open position. This movement of the waste gate toward open position in turn causes a decrease in the pressure of the air supplied by the compressor, and a hunting condition results in which the pressure being controlled continuously oscillates about the value which it is desired to maintain.

The establishment of such a hunting condition may be prevented by the use of the compensating controller 102. As previously described, the slider 75 of controller 102 is moved along resistance 76 in accordance with the rate of change of the pressure in the exhaust manifold. The rate of change of the exhaust manifold pressure is indicative of the force available to accelerate the turbine 27 and the compressor 12. Therefore, as the exhaust manifold pressure increases, the controller 102 is operated to increase the resistance in the upper left branch of the bridge circuit, which has the same effect on the unbalance of the bridge as a movement of slider 86 to the right. In other words, the addition of an increasing portion of resistance 76 in the upper left branch of the bridge increases the resistance of that branch in proportion to the resistance of the upper right branch just as the movement of slider 82 to the right increases the resistance in the upper left branch. This increased resistance in the upper left branch of the bridge causes a response of the amplifier 42 and motor 36 to drive the waste gate toward its open position, or at least, tends to oppose the unbalance of the bridge circuit which is causing motion of the waste gate toward its closed position. The operation of compensating controller 102 may therefore be said to anticipate the continued acceleration of the turbine 27 after the waste gate has stopped moving, and to compensate the system for such continued acceleration, by stopping the waste gate at a position short of that at which it would otherwise stop. When the waste gate is stopped in this manner, the continued acceleration of the turbine only serves to bring the compressor discharge pressure up to the value which it is desired to maintain, and prevents the establishment of a hunting condition.

The control point adjuster 120 may be manually operated to increase or decrease the resistance in the upper left branch of the bridge circuit. The setting of controller 120 determines the particular position at which the waste gate is stopped for a given value of pressure existing in the carburetor 16. It may therefore be used to set the value of pressure in the carburetor 16 which the system is to maintain by operation of the waste gate.

It may be desirable for the pilot to select any manifold pressure within a range of from 17 to 46 inches of mercury. After such a value of manifold pressure has been selected, it is usually desired that the system maintain the pressure in the manifold within a range of one inch of mercury more or less than the selected value. In order to produce these results, resistance 87 should be chosen so that it is 2/29 of the resistance of element 78. In other words, the slider 80 is to move from one end to the other of resistance 78 as the pressure in the intake manifold varies over a range of 29 inches, and the slider 88 is to move from one end to the other of resistance 87 as the slider 80 moves through a distance corresponding to a pressure change of two inches of mercury. By manipulation of resistance 93, the total resistance between the terminals of resistance element 87 may be varied, so that the operating differential of the system may be varied. The operating differential may be defined as the variation in pressure in the carburetor needed to cause movement of the waste gate from one end to the other of its range.

Since the control point selector 120 must vary the relationship between the control potentiometer 94 and the rebalancing potentiometer 122 over a very wide range of positions of the slider 80, and a relatively narrow range of positions of the slider 88, the resistance element 73 should have an unbalancing effect on the bridge circuit comparable to that of resistance 78. Since the compensating controller 102 may be required, under certain conditions, to completely overcome the effect of the main controller 94, resistance 76 should also be comparable in value to resistance 78.

If the proportion of resistance 73 connected in the upper left branch of the bridge circuit is increased, then the resistance of the upper left branch is increased in proportion to the resistance of the upper right branch. An increase in resistance element 73 therefore has the same unbalancing effect on the system as an increase in the intake manifold pressure. Such an increase causes the waste gate to move towards open position, thereby reducing the intake manifold pressure and causing the slider 80 to move to the left along resistance 78. Summarizing, it may be stated that an operation of control point adjuster 120 to increase the proportion of resistance 73 connected in the system lowers the value of intake manifold pressure selected, and an operation of controller 120 to decrease the proportion of resistance element 73 connected in the system operates to increase the pressure selected.

The check valve 97 and its by-passing orifice 98, together with the check valve 110 and its by-passing orifice 111, operate to slow the response of the system when either of the controlling conditions change in a direction which indicates a need for a closure of the waste gate. When the waste gate is in its closed position, all the exhaust gases of the engine pass through the turbine, and hence the turbine and compressor are operated at their maximum speed. This is the most active and hence the most dangerous condition of the turbine and compressor. Therefore it is desirable to make the system slower in its response to a change which indicates a need for operation of the turbine at higher speed, in order that the turbine speed will not be increased unnecessarily by a transient change in the controlling condition.

*Figure 2*

The system illustrated in Figure 2 is generally similar to the system of Figure 1, differing therefrom chiefly in that the compensating controller 102 of Figure 1 which responds to the rate of change of the exhaust manifold pressure has been replaced by a compensating controller 150, which may be a switch operated in response to an increase in either the acceleration or the velocity of the shaft 32 of turbine 27 above predetermined limiting values.

In the system of Figure 2, those elements which correspond to equivalent elements in Figure 1 have been given the same reference characters, while those which differ from the corresponding elements in Figure 1 have been given reference characters between 150 and 200.

The conductor 65 of Figure 1, which connected bridge output terminal 63 with amplifier input terminal 58, has been replaced in Figure 2 by a conductor 151 which connects output terminal 63 to ground at 152, and a conductor 153 which connects amplifier input terminal 58 to ground at 154. A conductor 155 connects the right hand terminal of resistance 78 to one terminal of the compensating controller 150, and a conductor 156 connects the opposite terminal of compensating controller 150 to ground at 157.

*Operation of Figure 2*

The operation of the system shown in Figure 2 is the same as that shown in Figure 1, except for the operation of the compensating controller 150. One modification of the compensating controller 150 is shown in detail in Figures 3 and 4, and another modification is shown in detail in Figures 5 and 6. This controller consists of a switch mechanism which is normally open, but which closes upon the occurrence of either an excessive velocity or an excessive acceleration of shaft 32, thereby shunting that portion of resistance 78 between its right terminal and the slider 80. This shunt connection may be traced from the right terminal of resistance 78 through conductor 155, switch 150, conductor 156, and ground connections 157 and 152, and conductor 151 to slider 80.

Shunting of the right hand portion of resistance 78 has the effect of suddenly unbalancing the bridge circuit in a direction to cause opening of the waste gate and hence decrease in speed of the turbine and compressor. Therefore, the controller 150 operates to limit the velocity and acceleration of turbine 27.

*Figure 3 and 4*

There is shown in Figure 3 a velocity and acceleration responsive switch which may be used as the controller 150 of Figure 2. This switch mechanism is enclosed by a generally cup-shaped housing 200, having a cover 201, which may be fastened thereto by any suitable means such as the screws 202. The housing 200 is centrally apertured to receive a shaft, which may be an extension of the shaft 32 of turbine 27. There is fixed on the shaft 32 a circular plate member 203 which serves as the upper race of a ball bearing, the lower race of which is fixed to the casing 200. Two diametrically opposite pairs of wings 205 are attached to the plate 203, so as to extend upwardly and outwardly therefrom. The wings 205 may, for example, be integral with the plate 203, as indicated in the drawing. A pin 206 passes through each set of wings 205, and pivotally supports a fly-ball weight 207. The weight 207 is extended on the inner side of the pin 206 to form a bell crank lever. The inner end 208 of the lever lies under a disk 210, which is carried by the shaft 32, but which is angularly movable with respect thereto.

The disk 210 is provided with cam surfaces 212 in its upper surface, which cooperate with corresponding cam surfaces in a second disk 213 positioned immediately above the disk 212. The end of the shaft 32 is hollow, and the lower surface of the disk 213 is provided with a guide pin 211 which extends into the hollow portion of the shaft. The pin 211 is suitably keyed to the shaft 32, as indicated at 209, so that no relative rotation may take place between disk 213 and shaft 32. The disk 210 is provided with a pair of extensions 214 which project outwardly from the disk 212 in opposite directions and carry at their outer extremities a pair of weights 215. Each of the weights 215 is biased to a normal angular position with respect to the shaft 32 by means of a pair of tension springs 216. The weights are shown in Figure 4 in their normal angular position. Each of the springs 216 is attached at one end to one of the weights 215 and at its opposite end to a bent over portion 217 at the end of one of the wings 205.

The disk 213 is fixed to a thrust rod 220 which extends upwardly therefrom, and through a sleeve 221 to a point outside the cover 201 of the housing 200. A compression spring 222 is held between the upper surface of disk 213 and the lower surface of a collar 223 which is slidable along the thrust rod 220. The upper surface of the collar 223 acts as the lower race of a ball bearing, and the lower surface of the sleeve 221 acts as the upper race of this ball bearing.

The outer surface of the lower portion of sleeve 221 is annularly grooved to provide a set of rack teeth 224 which cooperate with a pinion 225 carried by a shaft 226 which is journaled in the opposite sides of the casing 200. Outside the casing 200, one end of the shaft 226 is provided with a knurled knob 227, by which the shaft 226 may be rotated to cause pinion 225 to move the rack 224 up and down, thereby changing the compression of the spring 222. Suitable means, such as the set screw 228, is provided for locking the shaft 226 in any position to which it is adjusted by means of the knob 227.

The thrust rod 220 serves as the movable contact of an electrical switch, and cooperates with a stationary contact 230, which may be mounted by any suitable means (not shown) so as to be positioned above the upper end of thrust rod 220.

*Operation of Figures 3 and 4*

As the shaft 32 rotates, the centrifugal force acting on the weights 207 causes them to pivot about the pins 206, and the extensions 208 on the weights 207 engage the lower surface of the disk 210, thereby moving the disks 210 and 212 and the thrust rod 220 upward against the compression of spring 222. If the angular velocity of shaft 32 exceeds a value determined by the compression of spring 222, the upper end of thrust rod 220 moves into engagement with stationary contact 230, thereby completing the circuit between the conductors 155 and 156 of Figure 2. The thrust rod 220 is of course grounded through the disk 212 and shaft 32, which are constructed of electrically conductive material.

As long as the shaft 32 is rotating at a constant velocity, the weights 215 are moved therewith, the springs 216 determining their angular position with respect to shaft 32. Upon acceleration of shaft 32, the weights 215, because of their inertia, tend to lag behind the shaft 32, and therefore the disk 210 is moved angularly with respect to shaft 32. The disk 213 cannot move angularly with respect to shaft 32, however. The cam surfaces 212 on the upper surface of disk 210 therefore cooperate with the cam surfaces on the lower surface of disk 213 to cause separation of disks 212 and 213 and a consequent upward movement of disk 213 and thrust rod 220. If the acceleration of the shaft 32 exceeds a value determined by the compression of spring 222, the upper end of thrust rod 220 moves into engagement with stationary contact 230, thereby completing the circuit previously traced.

*Figures 5 and 6*

There is shown in Figures 5 and 6 a modified form of acceleration and velocity responsive switch which may be used as the compensating controller 150 of Figure 2. The switch mechanism of Figure 5 is mounted on a base 250 and enclosed by a housing 251, of inverted cup shaped form, which is attached to the base 250 by screws 252. The base 250 is apertured centrally to receive a shaft 253, which is provided at its lower end with a key 254 for attaching to an extension of shaft 32 of turbine 27. The shaft 253 is journaled in a bushing 255, which is received in the central aperture of base 250. Inside the casing 251 there is fixed on the shaft 253 a cup-shaped member 256 of electrically conductive material. The upper rim of the cup-shaped member 256 is notched or apertured at diametrically spaced points, as indicated at 257. Attached to the inside bottom surface of the cup-shaped member 256, as by screws 258, is an insulating plate 260. The plate 260 is provided with a central cylindrical raised portion, over which fits an inverted cup-shaped member 261. The inverted cup-shaped member 261 is much deeper than the raised portion of the plate 260, so that a considerable space exists between the top of the plate 260 and the under side of the upper portion of member 261. The member 261 is apertured at one side to receive a weight 262. The weight 262 is flanged outside the aperture in the member 261, so that it cannot be drawn through the aperture. A tension spring 263 has one end attached to the inner side of weight 262, and has its opposite end received in a suitable aperture in a diametrically opposite portion of the member 261. The construction is such that as the shaft 253 rotates, the centrifugal force acting on weight 262 causes it to move outwardly toward the cup-shaped member 256. When the angular velocity of the shaft 253 reaches a predetermined value, determined by the tension of the spring 263, the weight 262 engages the outer cup-shaped member 256, thereby completing an electrical circuit between the inner and outer cup-shaped members. The outer cup-shaped member is connected to ground through the shaft 253. The inner cup-shaped member 261 carries a pin 264 extending upwardly from the center thereof, and engaging at its upper end a brush 265 mounted on an insulating plate 266 carried by the housing 251. The brush 265 is electrically connected to a pin 267 which may be part of an electrical connector of a conventional type.

An insulating plate 270 is attached to the upper surface of the inner cup-shaped member 261, as by screws 271, and is provided with diametrically opposite wing portions 272 (see Figure 6), which project into but are considerably smaller than the apertures 257 in the rim of the outer cup-shaped member 256. A large weight 273, of generally cylindrical form, is supported on a bearing 274 carried by the pin 264. The weight 273 is provided with hollow cup-shaped recesses extending inwardly from the upper and lower surfaces thereof. The inner and outer cup-shaped members 261 and 256 are received in the lower of these two recesses, and the pin 264 extends through a central aperture in the weight 273 into the upper of the two cup-shaped recesses. A torsion spring 275 has one end attached to the inner wall of the upper recess in the weight 273, and its opposite end is suitably fixed to the pin 264.

A pair of contacts 276 are threadedly received in the inner wall of the lower cup-shaped recess in the weight 273, and project inwardly therefrom into the apertures 257 in the upper rim of the cup-shaped member 256.

When the shaft 253 is rotating at a constant speed, the weight 273 moves with the shaft at substantially the same speed, and at such a time the contacts 276 are in engagement with the extensions 272 on the insulating plate 270. When the shaft 253 acelerates, the weight 273, due to its inertia, lags behind. At a value of acceleration determined by the tension in the torsion spring 275, the angular lag of the weight 273 becomes sufficient so that the contacts 276 engage the edges of the apertures 257, thereby completing an electrical circuit between the pin 267 and the grounded cup-shaped member 256. The contacts 276 are shown in circuit-closing position in Figure 6.

It will be understood that pin 267 may be connected to the conductor 155 of Figure 2 and that the grounded shaft 253 is the equivalent of the ground connection 157 of Figure 2.

*Figure 7*

There is shown in Figure 7 an arrangement for simultaneously setting the control points of the intake manifold pressure control systems for the engines of a multiple engined aircraft. In Figure 7 the four intake manifold pressure control systems are schematically indicated at 300, 301, 302, and 303. Associated with each control system are control point adjusters numbered respectively 304, 305, 306, and 307. These control point adjusters are similar in every way, and therefore only the adjuster 304 is described in detail herein. The adjuster 304 includes a resistance 310 mounted upon a movable base 311, of insulating material. A slider 312 cooperates with the resistance 310. The lower end of slider 312 is fixed to a shaft 313, so that the slider 312 is moved with respect to resistance 310 upon rotation of shaft 313. The base 311 which supports resistance 130 is provided with a manual operating knob 314, by means of which the base 311 may be moved laterally through guides 315. The limits of lateral movement of base 311 are established by stops 316.

The shaft 313 is rotatable by manipulation of a crank 317, which acts through a motion-reducing gear train 318. The motion reducing mechanism 318 is provided so that the pilot cannot too rapidly change the control points of the intake manifold pressure control systems. If the pilot were able to change the control points of the systems too rapidly, he might cause the systems to close their respective waste gates suddenly with the result that the acceleration and velocity of the turbines would rise to unsafe values.

The slider of control point adjuster 305 carries an extension 320 at its lower end. A stop member 321 is positioned in the path of extension 320 so as to limit the maximum value of intake manifold pressure which the systems can be set to maintain. The stop member 321 is in the form of a rod which passes through two fixed members 322 and 323, and is provided, on the outside of the fixed member 323, with a manual operating knob 324. A collar 325 is fixed on the stop member 321, and a compression spring 326 is retained between the collar 325 and the fixed member 323. The stop member 321 is so positioned with respect to extension 320 that the maximum value of intake manifold pressure which the systems can be set to maintain is the maximum which the engines can safely stand. The power output of the engines may be increased by allowing the intake manifold pressure to increase above this value, although there is a risk of destroying an engine whenever the intake manifold pressure is permitted to increase above that value.

Under combat conditions, it is sometimes desirable to take the risk of destroying one or more engines, in order to be able to use the maximum power which the engines can produce. Such a condition arises, for example, when a bomber is attempting to run away from a fast enemy fighter plane.

By moving the knob 324 outwardly, the stop 321 may be moved out of the path of the extension 320, thereby permitting the pilot, by manipulation of crank 317, to move the control point of the intake manifold pressure control systems beyond the normal maximum value so as to produce the maximum power available. After the emergency has passed, if the pilot then restores the control point selecting mechanism to the normal range of values, the spring 326 snaps the stop 321 back into the path of movement of extension 320.

When the intake manifold pressures of the four engines have been selected by operation of the crank 317, it may become desirable, because of a partial disabling of one engine, to lower the intake manifold pressure for that one engine, while maintaining the pressures for the other engines at the previously determined value. This may be done by manipulating the knob 314 so as to move the resistance 310 to the left under the slider 312.

As previously noted in connection with the operation of Figure 1, a decrease in the proportion of resistance element 310 connected in the waste gate control system 300 operates to cause an increase in the pressure of the air supplied to the intake manifold, while an increase in the resistance element 310 causes a decrease in the intake manifold pressure. Therefore, operation of slider 312 in a counter clockwise direction about the pivot at its lower end causes the intake manifold pressure to increase, while an operation of the slider 312 in a clockwise direction causes the intake manifold pressure to decrease.

It may therefore be seen that a movement of base 311 to the left by manipulation of knob 314 operates to increase the portion of resistance 310 connected in the control system, and thereby to decrease the intake manifold pressure for engine No. 1. Since the normal position of base 311 is, as shown in the drawing, against the right stop 316, the proportion of resistance 310 connected in the control system may not be decreased by manipulation of knob 314 below the value determined by the position of slider 312. Therefore, although the intake manifold pressure of any engine may be decreased below the value established by operation of crank 317, none of the engines may have its intake manifold pressure increased above the value determined for all four engines.

A suitable indicator 327 may be attached to shaft 313 to indicate the control point selected for the intake manifold pressures of the engines.

*Figures 8 and 9*

There is shown in Figures 8 and 9 a gang controller suitable for the simultaneous selection of the control points of the pressure control systems of four engines, in the manner schematically indicated in Figure 7. The various parts of the controller shown in Figures 8 and 9 have been given the same reference characters as the corresponding elements schematically indicated in Figure 7. Referring to Figure 9, it may be seen that each of the resistance elements 310 is molded in the interior surface of annular insulating base 311. The sliders 312, which cooperate with the resistances 310, are fixed on a sleeve 313 surrounding a shaft 340 which is rotatable by a crank 317. The shaft 340 and the sleeve 313 are connected by a motion reducing gear train generally indicated at 318. The sleeve 313 carries with it a plate 341 carrying a suitable scale which cooperates with a stationary index 342 on a casing 343 which encloses the gang controller.

A projection 344 (see Figure 8) on the back of the plate 341 moves in a counter-clockwise direction as the controller is operating to increase the control points of the various systems. A removable limit stop 345, which is the equivalent of stop 321 of Figure 7, extends into the path of projection 344 so as to limit the maximum intake manifold pressure which the systems can be set to maintain. The limit stop 345 is a flat metal strip, and its outer end is bent upwardly to provide a manual operator 346, by which the stop 345 may be moved out of the path of projection 344, so as to allow the sliders 312 to be moved to the ends of their respective resistances 310. After the projection 344 has passed the removable stop 345, it may continue until it engages another stop 347, which is fixed to the casing 343.

Each of the bases 311 in which the resistances 310 are molded is attached to a pair of circular disks 351, which completely enclose the resistance element 310 so as to protect it from dust. The disks 351 are freely rotatable on the sleeve 313. A conical compression spring 350 engages a shoulder on the sleeve 313 at one end, and its other end presses against the inner portion of one of the disks 351. The spring 350 holds the disk 351 in frictional engagement with a partition 348, which serves to separate each control point adjuster including a slider 312 and a resistance 310 from an adjacent control point adjuster of similar construction. Therefore, when the sleeve 313 is rotated by manipulation of crank 317, the various sliders 312 are moved over their respective resistances 310, which remain stationary because of the frictional engagement of the disks 351 with the partitions 348. Each of the bases 311 projects outside the casing 343 through an opening in the upper extremity of the casing, and each base 311 is provided with a raised portion 314, by means of which it may be rotated with respect to the partitions 348 so as to change the control point of one of the engine control systems without disturbing the control points of the other three engines. Each base 311 carries a pin 352 (Figure 8), which engages a projection on the housing 343, and prevents the base 311 from being rotated in a direction to increase the control point for any engine above the value established for the other three engines.

While we have shown and described certain preferred embodiments of our invention, other modifications thereof will readily occur to those skilled in the art, and we therefore wish our invention to be limited only by the scope of the appended claims.

We claim as our invention:

1. Apparatus for controlling the pressure of the air supplied to an engine having a combustion chamber provided with a turbine-driven compressor for supplying air to said engine, comprising in combination, a device responsive to the pressure of the air supplied by the compressor, a device mechanically connected to and driven by the turbine responsive to the acceleration of said turbine, and means including both said devices for controlling the compressing effect of said compressor in such a manner as to limit both the pressure of the air supplied by said compressor and the acceleration of said compressor.

2. Apparatus for controlling the pressure of the air supplied to an engine having a combustion chamber provided with a turbine-driven compressor for supplying air to said engine, comprising in combination, means for controlling the speed of said turbine and compressor, motor means for driving said speed controlling means, a device mechanically connected to said driver by the turbine responsive to the acceleration of said turbine, and control means including said device for operating said motor means so as to prevent excessive accelerations of said turbine.

3. Apparatus for controlling the pressure of the air supplied to an engine having a combustion chamber provided with a turbine-driven compressor for supplying air to said engine and powered by exhaust gases from said engine, comprising in combination, means for controlling the speed of said turbine and compressor, motor means for driving said speed controlling means, a device responsive to the pressure of the air supplied by said compressor, means including said device for controlling said motor means to maintain said intake manifold pressure substantially constant, a device responsive to the direction of change of the pressure of said exhaust gases, means including said last-mentioned device for additionally controlling said motor means to rapidly reduce the speed of said turbine upon an increase in pressure of said exhaust gases and to slowly increase the speed of said turbine upon a decrease in the pressure of said exhaust gases.

4. Apparatus for controlling the pressure of the air supplied to an engine having a combustion chamber provided with a turbine-driven compressor for supplying air to said engine and powered by exhaust gases from said engine, comprising in combination, means for controlling the speed of said turbine and compressor, motor means for driving said speed controlling means, a device responsive to the pressure of the air supplied by said compressor, means including said device for controlling said motor means to maintain said intake manifold pressure substantially constant, a device responsive to the direction and rate of change of the pressure of said exhaust gases, means including said last-mentioned device for additionally controlling said motor means to limit the maximum acceleration of said turbine due to an increase in pressure of said exhaust gases without appreciably limiting the deceleration of said turbine due to a decrease in the pressure of said exhaust gases.

5. Apparatus for controlling the pressure of the air supplied to an engine having a combustion chamber provided with a turbine-driven compressor for supplying air to said engine and powered by exhaust gases from said engine, comprising in combination, means for controlling the speed of said turbine and compressor, motor means for driving said speed controlling means, a device responsive to the pressure of the air supplied by said compressor, means including said device for controlling said motor means to maintain said engine pressure substantially constant, a device responsive to the rate of change in the pressure of a fluid supplied thereto, conduit means for connecting said last-mentioned device in pressure sensing relationship with said exhaust gases, a check valve in said conduit means, means bypassing said check valve including an orifice, said check valve and orifice cooperating to delay response of said last-mentioned device to a decrease in exhaust gas pressure while permitting an immediate response to an increase in exhaust gas pressure, and means including said last-mentioned device for additionally controlling said motor means to limit acceleration of said turbine.

6. Apparatus for controlling the pressure of the air supplied to an engine having a combustion chamber engine provided with a turbine-driven compressor for supplying air to said engine and powered by exhaust gases from said engine, comprising in combination, means for controlling the speed of said turbine and compressor, motor means for driving said speed controlling means, a first device responsive to the pressure of the air supplied by said compressor, a second device responsive to the rate of change of the pressure of said exhaust gases, means responsive to the difference between said exhaust gas pressure and atmospheric pressure for varying the response of said second device, and means including both said devices for controlling said motor means so that the speed of said turbine and compressor is reduced by either an increase in the rate of change of exhaust gas pressure dependent upon the differential between exhaust gas and atmospheric pressures or upon an increase in the pressure of the air supplied by said compressor.

7. Apparatus for controlling the pressure of the air supplied to an engine having a combustion chamber provided with a turbine-driven compressor for supplying air to said engine, comprising in combination, means for controlling the speed of said turbine and compressor, motor means for driving said speed controlling means, a device connected to and driven by the turbine responsive to the acceleration of said turbine, and control means including said device for operating said motor means so as to prevent a predetermined acceleration of said turbine.

8. Apparatus for controlling the pressure of the air supplied to an engine having a combustion chamber provided with a turbine-driven compressor for supplying air to said engine, comprising in combination, means for controlling the speed of said turbine and compressor, motor means for driving said speed controlling means, means connected to and driven by the turbine responsive to the acceleration of said turbine, means responsive to the velocity of said turbine, and means including both said acceleration responsive means and said velocity responsive means for controlling said motor means so as to prevent predetermined velocities and accelerations of said turbine.

9. Apparatus for controlling the pressure of the air supplied to an engine having a combustion chamber engine provided with a turbine-driven compressor for supplying air to said engine, comprising in combination, means for controlling the speed of said turbine and compressor, motor means for driving said speed controlling means, means for controlling said motor means including a device effective when operated to reduce the speed of said turbine, means connected to and driven by the turbine responsive to the acceleration of said turbine for operating said device when the acceleration exceeds a predetermined value, and means responsive to the velocity of said turbine for operating said device when the velocity exceeds a predetermined value.

10. Apparatus for controlling the pressure of the air supplied to an engine having a combustion chamber provided with a compressor for supplying air to said engine, comprising in combination, means for controlling the compression ratio of said compressor, motor means for operating said compression ratio controlling means, a device responsive to a rate of change of a condition indicative of the need for operation of said compression ratio controlling means, means including said device for controlling said motor means, and means associated with said device for delaying the response of said device to a change of said condition in a direction indicative of a need for an increase in said compression ratio.

11. Apparatus for controlling the pressure of the air supplied to an engine having a combustion chamber provided with a compressor for supplying air to said engine, comprising in combination, means for controlling the compression ratio of said compressor, motor means for operating said compression ratio controlling means, a device responsive to a rate of change of a condition indicative of the need for operation of said compression ratio controlling means, means associated with said device for rendering the rate of response of said device to a change of said condition in a direction indicative of a need for an increase in said compression ratio slower than its rate of response to a change of said condition in the opposite direction, and means including said device for controlling said motor means.

12. Apparatus for controlling the pressure of the air supplied to an engine having a combustion chamber provided with a turbine-driven compressor for supplying air to said engine and powered by exhaust gases from said engine, comprising in combination, means for controlling the speed of said turbine and compressor, motor means for driving said speed controlling means, first control means responsive to the pressure of the air supplied by said compressor, second control means responsive to the rate of change in the pressure of said exhaust gases, means associated with each said control means to delay the response thereof to decreases but not to increases in their respective controlling pressures, and means including both said first and second control means for controlling said motor means.

13. Apparatus for controlling the pressure of the air supplied to an engine having a combustion chamber provided with a turbine-driven compressor for supplying air to said engine and powered by exhaust gases from said engine, comprising in combination, means for controlling the speed of said turbine and compressor, motor means for driving said speed controlling means, first control means responsive to the pressure of a fluid supplied thereto, conduit means for connecting said first control means in pressure sensing relationship with the air supplied by said compressor, second control means responsive to the rate of change in the pressure of a fluid supplied thereto, conduit means for connecting said second control means in pressure sensing relationship with said exhaust gases, a check valve in each of said conduit means, means by-passing each of said check valves, each said by-passing means including an orifice, said check valves and orifices cooperating to delay response of said first and second control means to decreases but not to increases in their respective controlling pressures, and means including both said first and second control means for controlling said motor means.

14. Apparatus for controlling the pressure of the air supplied to an engine having a combustion chamber provided with a turbine-driven compressor for supplying air to said engine and powered by exhaust gases from said engine, comprising in combination, means for controlling the speed of said turbine and compressor, motor means for driving said speed controlling means, first control means responsive to the pressure of the air supplied by said compressor, means associated with said first control means for delaying the response thereof to a decrease in said pressure, second control means responsive to a condition indicative of a need for limiting the speed of said turbine, means associated with said second control means for delaying the response thereof to a change in said condition in a direction indicative of a decreasing need for limiting the speed of said turbine but not to a change in the opposite direction, and means including both said first and second control means for controlling said motor means.

15. Electrical apparatus for controlling the pressure of the air supplied to an engine having a combustion chamber provided with a turbine-driven compressor for supplying air to said engine and powered by exhaust gases from said engine, comprising in combination, means for controlling the pressure of said exhaust gases to control the speed of said turbine and compressor, electrical motor means for driving said pressure controlling means, a normally balanced electrical impedance means, a normally balanced electrical impedance network, means responsive to unbalance of said network for controlling said motor means, a device responsive to the pressure of the air supplied by said compressor, a device responsive to the rate of change of the pressure of said exhaust gases, means operated by each of said devices for varying the impedance of said network to unbalance said network, and means operated by said motor means concurrently with said pressure controlling means for rebalancing said network.

16. Electrical apparatus for controlling the pressure to the air supplied to an engine having a combustion chamber provided with a turbine-driven compressor for supplying air to said engine and powered by exhaust gases from said engine, comprising in combination, means for controlling the pressure of said exhaust gases to control the speed of said turbine and compressor, electrical motor means for driving said pressure controlling means, a normally balanced electrical impedance network, means responsive to unbalance of said network for controlling said pressure motor means, a device responsive to the pressure of the air supplied by said compressor, a device responsive to the acceleration of said turbine, means operated by each of said devices for varying the impedance of said network to unbalance said network, and means operated by said motor means concurrently with said pressure controlling means for rebalancing said network.

17. Electrical apparatus for controlling the pressure of the air supplied to an engine having a combustion chamber provided with a turbine-driven compressor for supplying air to said engine and powered by exhaust gases from said engine, comprising in combination, means for controlling the pressure of said exhaust gases to control the speed of said turbine and compressor, electrical motor means for driving said pressure controlling means, a normally balanced electrical impedance network, means responsive to unbalance of said network for controlling said motor means, a device responsive to the pressure of the air supplied by said compressor, a device responsive to the velocity of said turbine, a device responsive to the acceleration of said turbine, means operated by each of said devices for varying the impedance of said network to unbalance said network, and means operated by said motor means concurrently with said pressure controlling means for rebalancing said network.

18. Electrical apparatus for controlling the pressure of the air supplied to an engine having a combustion chamber provided with a turbine-driven compressor for supplying air to said engine, comprising in combination, means for controlling the compression ratio of said compressor, electrical motor means for driving said compression ratio controlling means, an electric impedance network, means responsive to a potential in said network for controlling said motor means, a device responsive to a condition indicative of the need for operation of said compression ratio controlling means, a device responsive to the acceleration of said turbine, means operated by each of said devices for varying the impedance of said network to vary a potential therein, and means responsive to said potential for controlling said motor means.

19. Apparatus for controlling the pressure of the air supplied to an engine having a combustion chamber provided with a turbine-driven compressor for supplying air to said engine, comprising in combination, means for controlling the supply of motive fluid to said turbine, motor means for driving said fluid supply control means, a device responsive to the pressure of the air supplied by said compressor, means including said device for normally controlling said motor means, a rotating shaft driven by said turbine, first inertia means carried by said shaft including a mass movable with respect to said shaft about the axis thereof, a flexible driving connection between said shaft and said inertia means to permit said inertia means to change its position relative to said shaft upon acceleration of said shaft, second inertia means carried by said shaft including a mass movable radially with respect to the axis of said shaft upon the occurrence of a centrifugal force due to rotation of said shaft, means yieldably restraining movement of said second inertia means, control means operable by movement of either of said first and second inertia means with respect to said shaft, and means responsive to said control means for additionally controlling said motor means.

20. Electrical apparatus for controlling the pressure of the air supplied to an engine having a combustion chamber provided with a compressor for supplying air to said engine and means for driving said compressor, comprising in combination, means for controlling the speed of said driving means and compressor, electrical motor means for driving said speed controlling means, a normally balanced electrical impedance network, means responsive to unbalance of said network for controlling said motor means to cause the latter to position said speed controlling means so as either to increase or decrease the speed depending upon the direction of unbalance of said network, a device responsive to the pressure of the air supplied by said compressor, a device responsive to the acceleration of said turbine, means operated by each of said devices for varying the impedance of said network so as to unbalance said network in such a direction as to cause the speed of said compressor to be reduced upon an increase in either said pressure or said acceleration, and means operated by said motor means concurrently with said pressure controlling means for rebalancing said network.

21. Electrical apparatus for controlling the pressure of the air supplied to an engine having a combustion chamber provided with a turbine driven compressor for supplying air to said chamber and powered by the exhaust gases from said engine, comprising in combination, means for controlling the pressure of said exhaust gases to control the speed of the turbine and compressor, electrical motor means for driving said pressure controlling means, a normally balanced electrical impedance network, means responsive to unbalance of said network for controlling said motor means, a device responsive to the pressure of the air supplied by the compressor, a device responsive to the rate of change of the pressure of said exhaust gases, means operated by each of said devices for varying the impedance of said network to unbalance said network, and means operated by said motor means concurrently with said pressure controlling means for rebalancing said network.

HUBERT T. SPARROW.
ALBERT E. BAAK.

REFERENCES CITED

The following references are of record in the file of this patent:

UNITED STATES PATENTS

| Number | Name | Date |
|---|---|---|
| 805,392 | Warren | Nov. 21, 1905 |
| 1,240,531 | Banner | Sept. 18, 1917 |
| 1,507,356 | Horton | Sept. 2, 1924 |
| 1,508,731 | Standerwick | Sept. 16, 1924 |
| 1,508,707 | Moss | Sept. 16, 1924 |
| 1,998,362 | Dodson | Apr. 16, 1935 |
| 2,123,084 | Tanson | July 5, 1938 |
| 2,141,260 | Caughey | Dec. 27, 1938 |
| 2,305,810 | Muller | Dec. 22, 1942 |
| 2,315,273 | Putt | Mar. 30, 1943 |
| 2,374,708 | Shoults | May 1, 1945 |